United States Patent
Koto

(10) Patent No.: US 6,598,187 B1
(45) Date of Patent: Jul. 22, 2003

(54) SEMICONDUCTOR INTEGRATED CIRCUIT DEVICE WITH TEST CIRCUIT

(75) Inventor: Tomohiko Koto, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/500,082

(22) Filed: Feb. 8, 2000

(30) Foreign Application Priority Data

Feb. 8, 1999  (JP) .......................... 11-030074

(51) Int. Cl.⁷ .......................... G06K 5/04; G06K 11/00; G11B 20/20; G11B 5/00; H03M 13/00
(52) U.S. Cl. .................. 714/700; 714/798; 714/815
(58) Field of Search ................. 714/700, 798, 714/815

(56) References Cited

U.S. PATENT DOCUMENTS

| | | | | | |
|---|---|---|---|---|---|
| 5,003,256 A | * | 3/1991 | Merrill | ........................ | 714/814 |
| 5,014,226 A | * | 5/1991 | Horstmann et al. | ............. | 716/4 |
| 5,122,978 A | * | 6/1992 | Merrill | ........................ | 702/79 |
| 5,235,566 A | * | 8/1993 | Merrill | ........................ | 368/113 |
| 5,291,141 A | * | 3/1994 | Farwell et al. | ............... | 324/617 |
| 5,396,183 A | * | 3/1995 | Farwell et al. | ............... | 368/113 |
| 5,428,626 A | * | 6/1995 | Frisch et al. | .................. | 714/744 |
| 5,467,464 A | * | 11/1995 | Oprescu et al. | .............. | 713/400 |
| 5,578,938 A | * | 11/1996 | Kazami | ........................ | 326/16 |
| 5,768,159 A | * | 6/1998 | Belkadi et al. | ................ | 703/19 |
| 6,101,197 A | * | 8/2000 | Keeth et al. | ................. | 370/517 |
| 6,128,253 A | * | 10/2000 | Yamauchi | .................... | 368/120 |
| 6,311,148 B1 | * | 10/2001 | Krishnamoorthy | ........... | 703/19 |
| 6,373,313 B1 | * | 4/2002 | Hishiyama | ................... | 327/276 |

FOREIGN PATENT DOCUMENTS

JP          3-101245          4/1991

* cited by examiner

Primary Examiner—Albert Decady
Assistant Examiner—Joseph D. Torres
(74) Attorney, Agent, or Firm—Arent Fox Kintner Plotkin & Kahn, PLLC

(57) ABSTRACT

A semiconductor integrated circuit having a latch including a data input terminal and a timing input terminal, has a first input terminal connected to the latch data input terminal and a second input terminal connected to the latch timing input terminal. A delay circuit, connected between the first and second input terminals, receives a test signal being supplied to a selected one of the first and second input terminals and supplies a delayed test signal to the nonselected one of the first and second input terminals.

15 Claims, 14 Drawing Sheets

SEMICONDUCTOR INTEGRATED CIRCUIT DEVICE WITH TEST CIRCUIT

BACKGROUND OF THE INVENTION

The present invention relates to a semiconductor integrated circuit device, and more particularly, to an input circuit of a synchronous semiconductor memory unit which acquires an input signal synchronized with a reference input (clock signal) and a test method of the input circuit.

FIG. 1 is a schematic block diagram of a conventional semiconductor integrated circuit device 100. The semiconductor integrated circuit device 100 comprises a latch circuit 40, an input circuit 50 including first and second input terminals 41 and 42 and an internal circuit 60. The data input terminal D of the latch circuit 40 is connected to the first input terminal 41 and the timing input terminal (clock terminal) T is connected to the second input terminal 42. A clock signal is supplied to the timing input terminal T via the second input terminal 42 and a data signal is supplied to the data input terminal D via the first input terminal 41. The latch circuit 40 latches the data signal in accordance with the clock signal and supplies a latched data signal from the output terminal Q to the internal circuit 60.

As the speed and frequency of semiconductor integrated circuit devices increases, the setup and hold time of the latch circuit 40 must be reduced. Also, a test for guaranteeing the setup time and hold time of the latch circuit 40 needs to be performed. In a warranty test, two test signals are supplied from two independent signal sources (drivers) of a test device to the first and second input terminals 41 and 42, respectively. That is, the two test signals are supplied to the data input terminal D and the timing input terminal T via the first and second input terminals 41 and 42, respectively, so that a time difference Δts which corresponds to the setup time as shown in FIG. 2(a) and a time difference Δth which corresponds to the hold time as shown in FIG. 2(b) can be generated. The setup time and hold time are guaranteed depending on whether the latch circuit 40 can normally latch data.

In an actual test performed on a semiconductor device prior to shipment, the time differences Δts and Δth of the two test signals are set more strictly in order to account for timing skew and test margin of the test device. However, even if the setup time and hold time of the latch circuit 40 are reduced, the reduction in the timing skew of the test device is still approaching its limit. Accordingly, it is difficult to set the time differences Δts and Δth and consider the timing skew.

A case where the warranty test for a 0.5 ns setup time is executed is described below. In this case, as shown in FIG. 3(a), the test is performed so that the second test signal supplied to the data input terminal D varies 0.5 ns before the leading edge of the first test signal supplied to the timing input terminal T. However, even if the time difference Δt of the two test signals is set to 0.5 ns, as shown in FIG. 3(b), each test signal is shifted over time as shown by the dotted lines according to the timing skew Tsk (for example, ±0.2 ns) of each test signal.

FIG. 3(c) shows the shift of the second test signal input to the data input terminal D based on the first test signal supplied to the timing input terminal T. In this case, the relative skew Tskr of the second test signal is ±0.4 ns (±0.2 ns×2). That is, if the first test signal at time t1 according to the maximum +0.4 ns varies, the setup time is 0.9 ns. Accordingly, even if the latch circuit 40 latches data at 0.9 ns, the 0.5 ns setup time will not be guaranteed.

That is, the timing of the two test signals needs to be set considering the maximum time difference between the first and second test signals. In other words, to guarantee the 0.5 ns setup time, as shown in FIG. 3(d), the time difference Δt needs to be set to 0.1 ns. However, if the relative skew is small, the second test signal may vary after the first test signal has varied. In this case, the latch circuit 40 cannot latch data. If a test is performed in this manner by increasing the margin of the setup time Ts, a problem arises in which many test errors are generated, causing a reduced yield.

One approach to solving this problem is to reduce the timing skew Tsk of the test signal. However, to considerably reduce the timing skew, expensive test equipment is required, which increases the test cost.

SUMMARY OF THE INVENTION

It is an object of the present invention to provide a semiconductor integrated circuit device which correctly conducts the warranty test of the setup time and hold time.

One aspect of the present invention provides a semiconductor integrated circuit device including a latch circuit having a data input terminal and a timing input terminal. A first input terminal is connected to the data input terminal of the latch circuit. A second input terminal is connected to the timing input terminal of the latch circuit. A delay circuit is connected between the first input terminal and the second input terminal to receive a test signal supplied to a selected one of the first and second input terminals and supply a delayed test signal to the data input terminal or the timing input terminal corresponding to the nonselected one of the first and second input terminals.

Another aspect of the present invention provides a semiconductor integrated circuit device including a latch circuit having a data input terminal and a timing input terminal. A first input terminal is connected to the data input terminal of the latch circuit. A second input terminal is connected to the timing input terminal of the latch circuit. A delay circuit is connected between the first input terminal and the second input terminal. A test signal input terminal is connected to at least one of a first node between the first input terminal and the delay circuit and a second node between the second input terminal and the delay circuit. The delay circuit receives a test signal supplied to the test signal input terminal and provides a delayed test signal to one of the first and second input terminals.

Yet another aspect of the present invention provides a semiconductor integrated circuit device including a latch circuit having a first data input terminal, a first timing input terminal and a first output terminal. A first input terminal is connected to the first data input terminal of the latch circuit. A second input terminal is connected to the first timing input terminal of the latch circuit. A delay circuit is connected between the first input terminal and the second input terminal to receive a test signal supplied to a selected one of the first and second input terminals and supply a delayed test signal to the first data and first timing input terminals corresponding to the nonselected one of the first and second input terminals. A reference latch circuit has a second data input terminal, a second timing input terminal and a second output terminal. The second timing input terminal of the reference latch circuit is connected to the first timing input terminal of the latch circuit and the second input terminal. A reference delay circuit is connected between the first data input terminal of the latch circuit and the second data input terminal of the reference latch circuit. A comparator is connected to the first output terminal of the latch circuit and the second output terminal of the reference latch circuit.

Another aspect of the present invention provides a method of testing one of a setup time and a hold time of a latch circuit of a semiconductor integrated circuit. The latch circuit has a data input terminal and a timing input terminal. First, a test signal is supplied to a selected one of the data input terminal and the timing input terminal of the latch circuit. Then, the test signal is delayed with a delay circuit. The test signal delayed by the delay circuit is provided to the other, nonselected one of the data input terminal and the timing input terminal of the latch circuit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
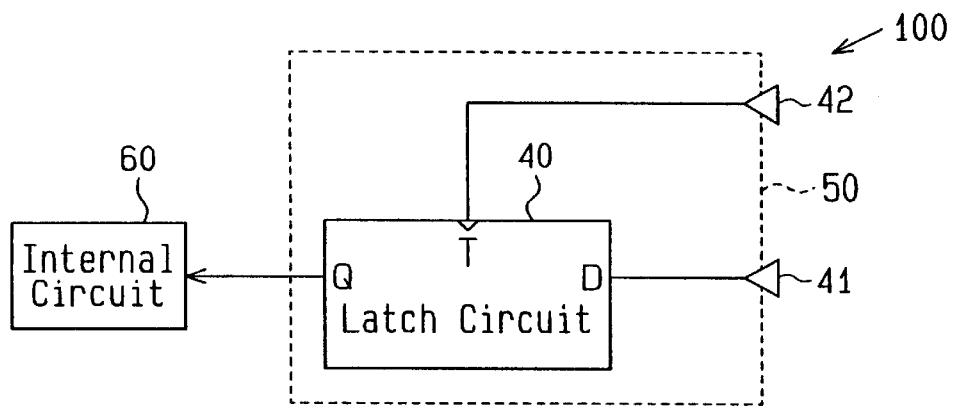
FIG. 1 is a schematic block diagram of a conventional semiconductor integrated circuit device.
Figure 2A:
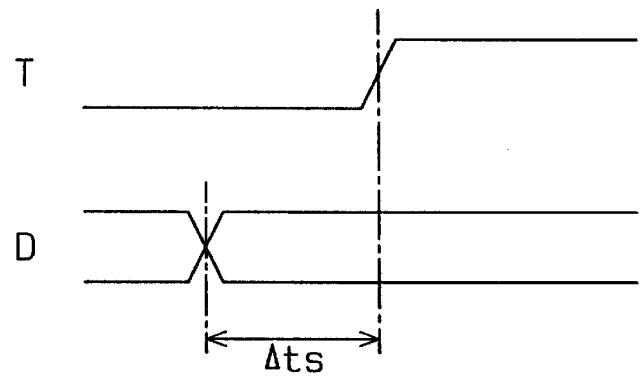
FIG. 2(a) is a waveform chart of a warranty test signal of the setup time supplied to the semiconductor integrated circuit device of FIG. 1.
Figure 2B:
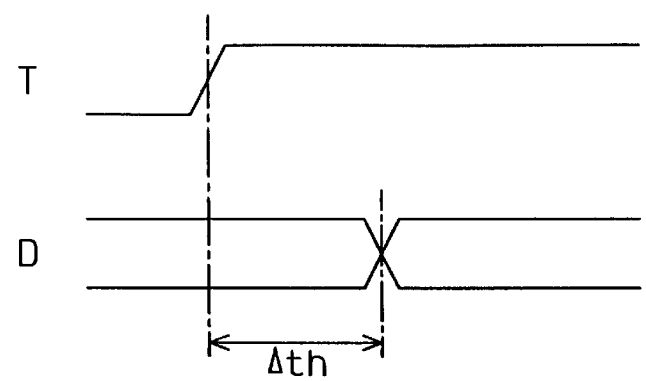
FIG. 2(b) is a waveform chart of a warranty test signal of the hold time supplied to the semiconductor integrated circuit device of FIG. 1.
Figure 3A:
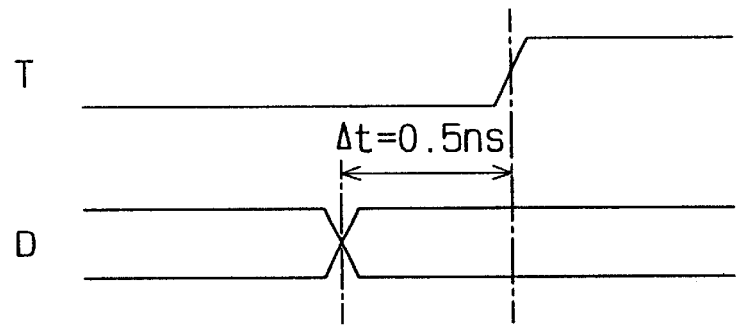
FIGS. 3(a) to (d) are waveform charts of warranty test signals of the setup time supplied to the semiconductor integrated circuit device of FIG. 1.
Figure 3B:
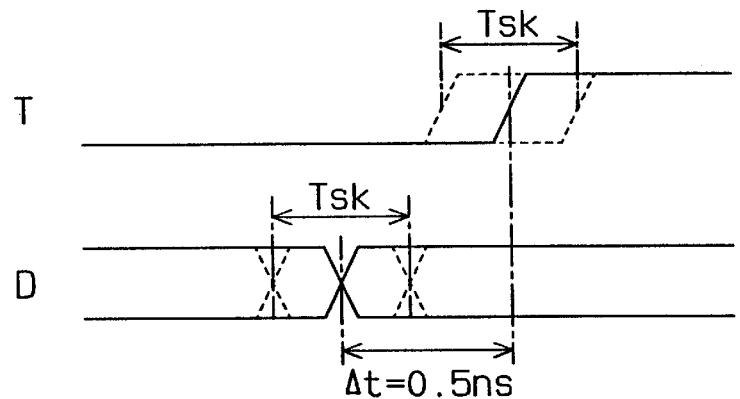
Figure 3C:
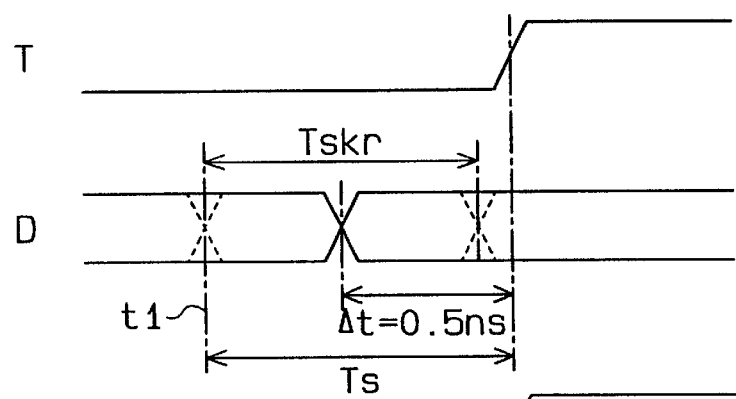
Figure 3D:
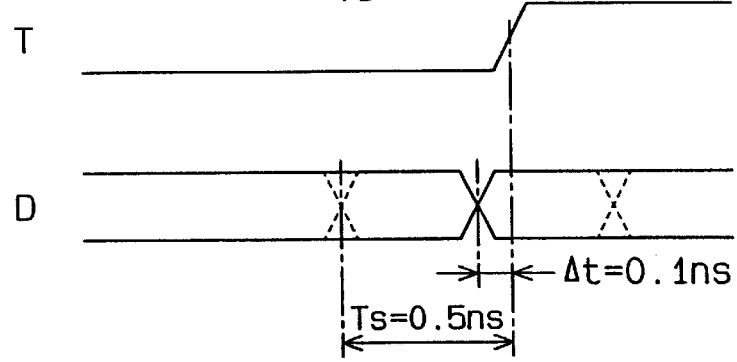

In the drawings, like numerals are used for like elements throughout.

Figure 4:
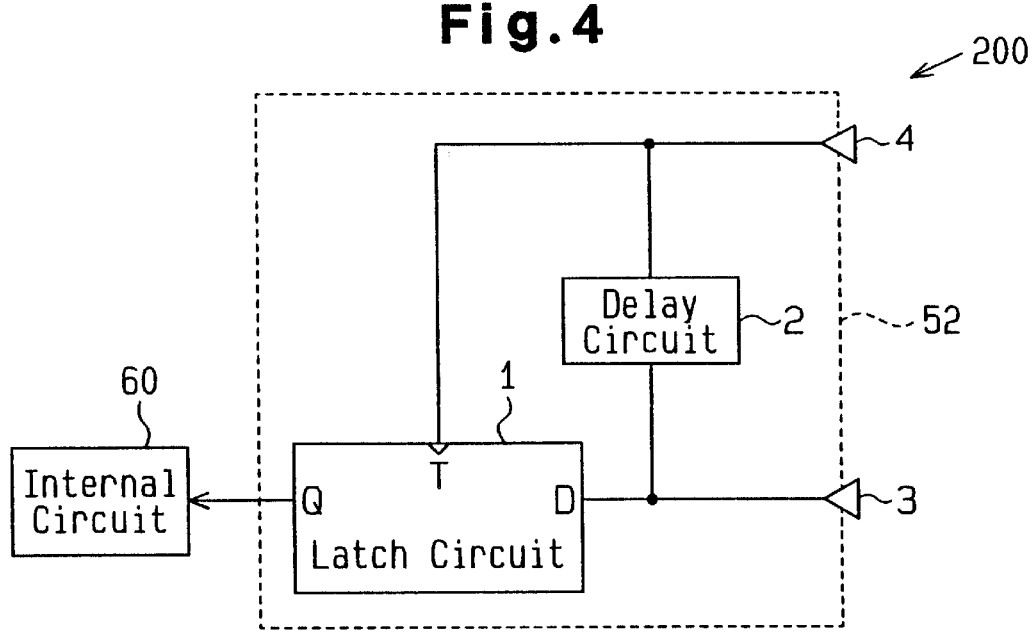
FIG. 4 is a schematic block diagram of a semiconductor integrated circuit device according to a first embodiment of the present invention.

FIG. 4 is a schematic block diagram of a semiconductor integrated circuit device 200 according to a first embodiment of the present invention. The semiconductor integrated circuit device 200 comprises an input circuit 52 including a latch circuit 1, a delay circuit 2 and first and second input terminals 3, 4 and an internal circuit 60. The first input terminal 3 is connected to the data input terminal D of the latch circuit 1 and the second input terminal 4 is connected to the timing input terminal T of the latch circuit 1. The delay circuit 2 is connected between the first and second input terminals 3 and 4.

When the latch circuit 1 is tested, a test signal is supplied from a signal source of a test device to either the first input terminal 3 or the second input terminal 4. A test signal delayed by the delay circuit 2 is supplied to either the data input terminal D or the timing input terminal T, and the test signal is supplied to the other terminal. Accordingly, test signals having a time difference are supplied to the data input terminal D and the timing input terminal T. Because the test signal is produced from one signal source, the relative skew is zero. Further, the timing skew of the signal source will not affect the time difference of the test signal supplied to the latch circuit 1. Therefore, the warranty test for the setup time and hold time is correctly performed without having to consider the timing skew and relative skew.

Figure 5B:
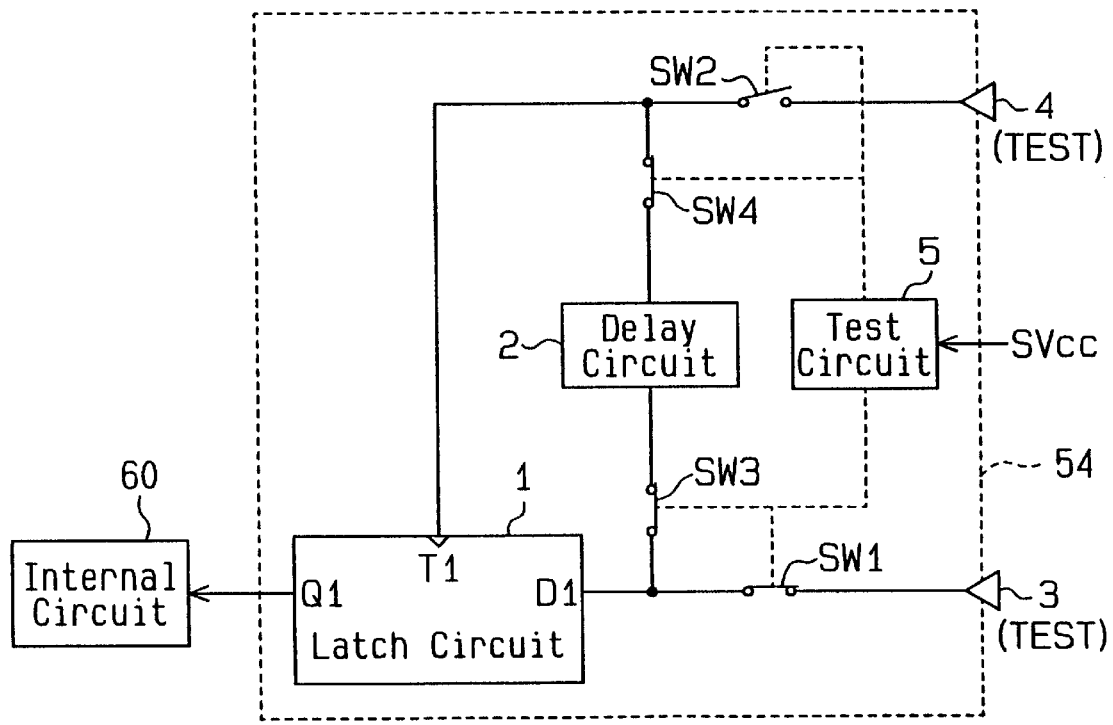
FIG. 5(b) is a schematic block diagram of a test input circuit of the semiconductor integrated circuit of FIG. 5(a)
Figure 5A:
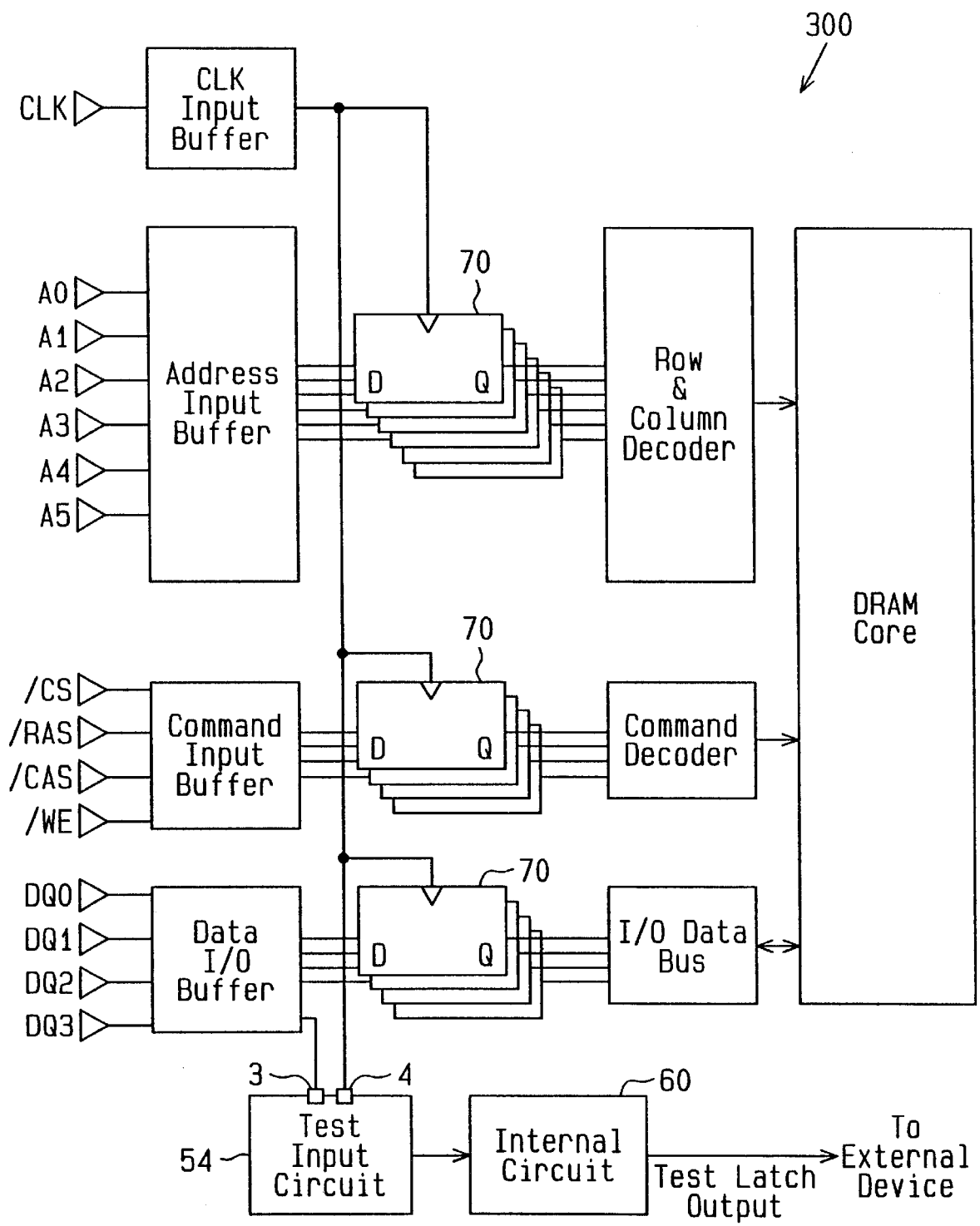
FIG. 5(a) is a schematic block diagram of a semiconductor integrated circuit device according to a second embodiment of the present invention

FIG. 5(a) is a schematic block diagram of a semiconductor integrated circuit device 300 according to the second embodiment of the present invention. The semiconductor integrated circuit device 300 comprises latch circuits 70, a test input circuit 54 and the internal circuit 60. As shown in FIG. 5(b), the test input circuit 54 includes the latch circuit 1, the delay circuit 2 and a test circuit 5. The latch circuit 1 is used to test the setup time and hold time of the latch circuits 70 and has the same construction as the latch circuits 70. The data input terminal D1 of the latch circuit 1 is connected to the first input terminal 3 via a switch SW1 and the timing input terminal (clock terminal) T1 of the latch circuit 1 is connected to the second input terminal 4 via a switch SW2. When a signal supplied to the timing input terminal T1 changes from the L level to the H level, the latch circuit 1 latches a data signal supplied from the data input terminal D1 and provides the latched data signal from the output terminal Q1 to the internal circuit 60. The internal circuit 60 provides the latched data signal with an external device, such as a test device. The latched data signal is evaluated as latched data signals output from the latch circuits 70 by the external device.

The delay circuit 2 preferably includes a plurality of capacitance elements or a plurality of buffer circuits. The first terminal of the delay circuit 2 is connected to the data input terminal D1 of the latch circuit 1 via a switch SW3 and the second terminal of the delay circuit 2 is connected to the timing input terminal T1 of the latch circuit 1 via a switch SW4. The delay circuit 2 delays a signal supplied to either the first or second terminal for a predetermined time and outputs a delayed signal from the other terminal. The delay time corresponds to the operation warranty time (setup time and hold time) of the latch circuit 1 and the latch circuits 70.

Figure 5C:
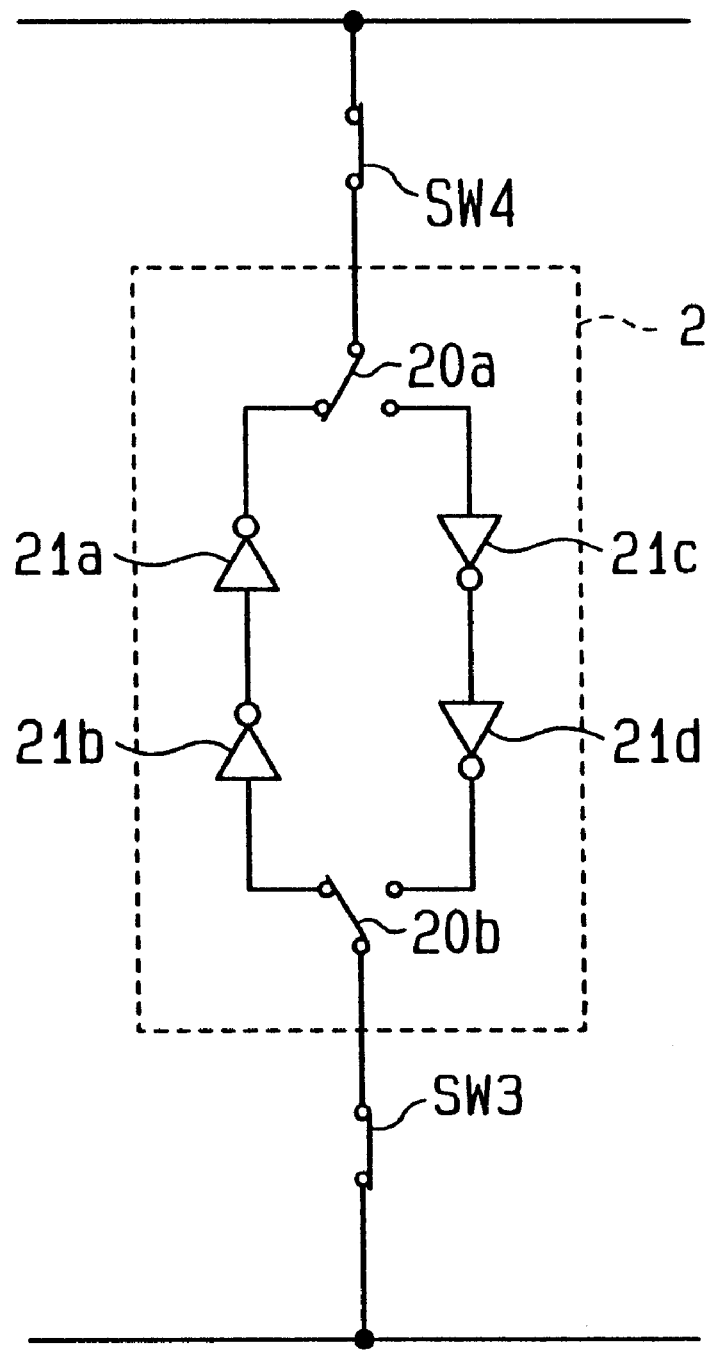
FIG. 5(c) is a circuit diagram of a delay circuit of the test input circuit of FIG. 5(b)

FIG. 5(c) shows an example of the delay circuit 2. The delay circuit 2 includes switches 20a, 20b, two buffer circuits 21a, 21b connected in series between the switches 20a, 20b in a forward direction, and two buffer circuits 21c, 21d connected in series between the switches 20a, 20b in a reverse direction. Either the buffer circuits 21a, 21b or the buffer circuits 21c, 21d are selected by switching the switches 20a, 20b under the control of the test circuit 5.

The test circuit 5 is deactivated when the semiconductor integrated circuit device 200 is in a normal operation. At this time, the switches SW1 and SW2 are turned on and the switches SW3 and SW4 are turned off. The test circuit 5 is activated by a high potential power supply SVcc supplied from an external device (for example, a test device) and controls the ON and OFF of each of the switches SW1 to SW4 and the switches 20a, 20b in accordance with a predetermined control command (set by a combination of control signals). The voltage of the high potential power supply SVcc is preferably higher than a predetermined reference voltage.

The delay circuit 2, the test circuit 5 and the switches SW1 to SW4 form a warranty circuit for executing the warranty test of the setup time and hold time.

Next, the test process of the semiconductor integrated circuit device 200 is described. In this description, the delay time of the delay circuit 2 is assumed to be substantially the same as the operation warranty time of the latch circuit 1.

When a test signal TEST from a test device is provided to either the first input terminal 3 or the second input terminal 4, the test signal is delayed by the delay circuit 2 and the delayed test signal is supplied to either the timing input terminal T1 or the data input terminal D1. That is, test signals having a time difference are supplied to the timing input terminal T1 and the data input terminal D1. Then, the warranty test of the setup time or hold time is executed.

First, the warranty test of the setup time is described. First, the test circuit 5 turns on the switches SW1, SW3 and SW4 and turns off the switch SW2.

When the test signal TEST is supplied to the first input terminal 3 from the test device, the test signal TEST is supplied to the data input terminal D1 without any delay and a delayed test signal delayed by the delay circuit 2 is supplied to the timing input terminal T1.

Figure 6A:
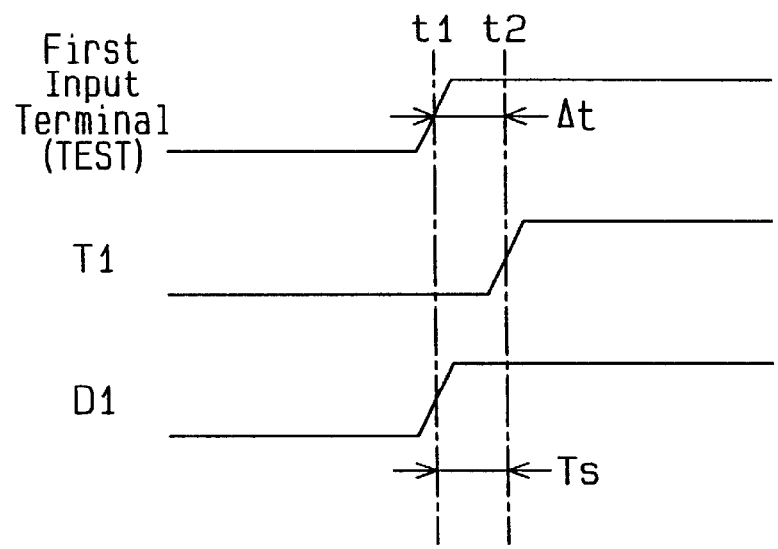
FIG. 6(a) is a waveform chart of a warranty test signal of the setup time supplied to the semiconductor integrated circuit device of FIG. 5(a)

Specifically, as shown in FIG. 6(a), the test device changes the test signal TEST supplied to the first input terminal 3 from the L level to the H level at time t1. Then, a delayed test signal which rises to the H level at time t2, after the delay time Δt, is supplied to the timing input terminal T1 of the latch circuit 1. At this time, a test signal having the H level is supplied to the data input terminal D1 earlier than the time t2 by the time Ts (Δt) when the delayed test signal rises. Accordingly, if a test signal having the H level is latched by the latch circuit 1 when the delayed test signal rises and if the latch signal having the H level is output from the output terminal Q1, the setup time Ts is guaranteed. The setup time Ts corresponds to a delay time Δt. In other words, if the latch circuit 1 cannot latch the test signal (data signal) having the H level, the setup time Ts is not guaranteed.

Next, the warranty test of the hold time Th is described. First, the test circuit 5 turns on the switches SW2, SW3 and SW4 and turns off the switch SW1.

When a test signal TEST is supplied to the second input terminal 4 from a test device, the test signal is supplied to the timing input terminal T1 without any delay and a delayed test signal delayed by the delay circuit 2 is supplied to the data input terminal D1.

Figure 6B:
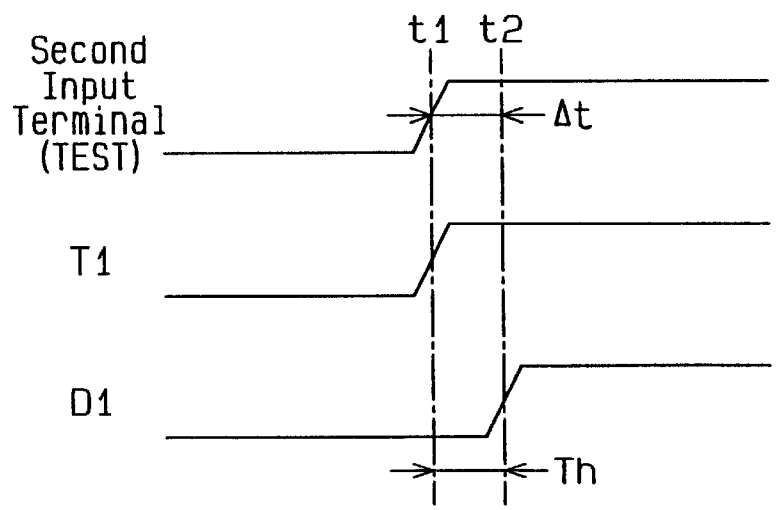
FIG. 6(b) is a waveform chart of a warranty test signal of the hold time supplied to the semiconductor integrated circuit device of FIG. 5(a)

Specifically, as shown in FIG. 6(b), the test device changes the test signal TEST supplied to the second input terminal 4 from the L level to the H level at time t1. Then, a delayed test signal which rises to the H level at time t2 after the delay time Δt is supplied to the data input terminal D1 of the latch circuit 1. In other words, after the time Th (Δt) has elapsed from the time t1 when the test signal rises, a delayed test signal having the H level is supplied to the data input terminal D1. Accordingly, if a test signal having the L level is latched by the latch circuit 1 when the delayed test signal rises and if the latch signal having the L level is output from the output terminal Q1, the hold time Th is guaranteed. The hold time Th corresponds to a delay time Δt. In other words, if the latch circuit 1 cannot latch the test signal (data signal) having the L level, the hold time Th is not guaranteed. Thus, the warranty test of the setup time Ts and hold time Th is executed using the delay time Δt of the delay circuit 2.

The delay time Δt of the delay circuit 2 need not be the same as the operation warranty time of the latch circuit 1. The test method by which a delay time Δta is set exceeding the operation warranty time of the latch circuit 1 is described. In this case, as shown in FIGS. 7(a) and (b), a test device supplies the first or second input terminal 3 or 4 with a test signal having a total pulse width of the delay time Δta of the delay circuit 2 and the operation warranty time (Ts or Th) of the latch circuit 1.

In the setup time warranty test, the test circuit 5 turns on the switches SW2, SW3 and SW4 and turns off the switch SW1. Then a test signal TEST is supplied to the second input terminal 4 from the test device.

Figure 7A:
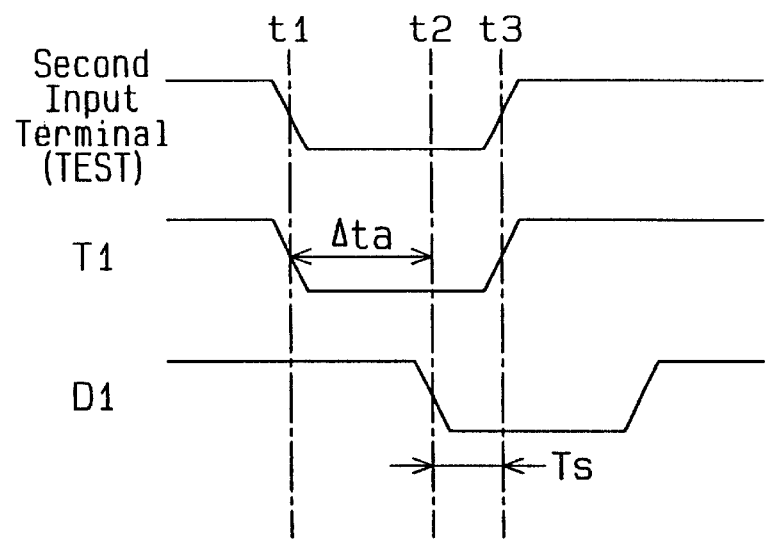
FIG. 7(a) is a waveform chart of a warranty test signal of the setup time supplied to the semiconductor integrated circuit device of FIG. 5(a)

Specifically, as shown in FIG. 7(a), the test device causes the test signal TEST supplied to the second input terminal 4 (i.e., timing input terminal T1) to fall to the L level at time t1. Then a delayed test signal which falls to the L level at time t2 after the delay time Δta of the delay circuit 2 has elapsed is supplied to the data input terminal D1 of the latch circuit 1. Subsequently, the test device causes the test signal TEST to rise to the H level at time t3. At this time, at the time Ts earlier than the time t3, a delayed test signal having the L level is supplied to the data input terminal D1 of the latch circuit 1. Accordingly, if the delayed test signal having the L level is latched by the latch circuit 1 at time t3 and if the delayed test signal having the L level is output from the output terminal Q of the latch circuit 1, the setup time Ts is guaranteed.

In the hold time Th warranty test, the test circuit 5 turns on the switches SW1, SW3 and SW4 and turns off the switch SW2. Then a test signal TEST is supplied from the test device to the first input terminal 3.

Figure 7B:
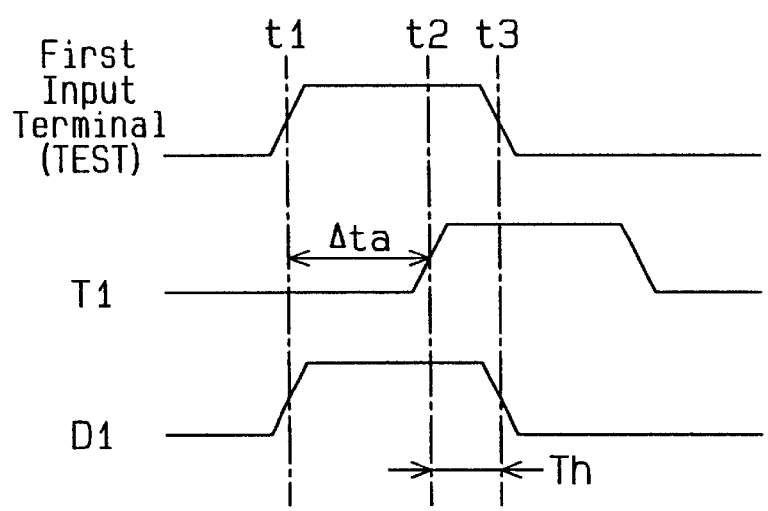
FIG. 7(b) is a waveform chart of a warranty test signal of the hold time supplied to the semiconductor integrated circuit device of FIG. 5(a)

Specifically, as shown in FIG. 7(b), the test device causes a test signal TEST supplied to the first input terminal 3 (that is, data input terminal Dl) to rise to the H level at time t1. Then, a delayed test signal which rises to the H level at time t2 after the delay time Δta of the delay circuit 2 has elapsed is supplied to the timing input terminal T1 of the latch circuit 1. Subsequently, the test device causes the test signal TEST to fall to the L level at time t3. At this time, after the time Th has elapsed from the time t2, a test signal having the L level is supplied to the data input terminal D1 of the latch circuit 1. Accordingly, if the delayed test signal having the H level is latched by the latch circuit 1 at time t2 and if the test signal having the H level is output from the output terminal Q of the latch circuit 1, the hold time Th is guaranteed.

After the warranty test of the setup time Ts and hold time Th has been completed, in the normal operation mode, the switches SW1 and SW2 are turned on and the switches SW3 and SW4 are turned off. That is, when the semiconductor integrated circuit device 200 is in the normal operation mode, the delay circuit 2 is disconnected from the latch circuit 1.

The delay time Δta may also exceed the operation warranty time of the latch circuit 1 and the delay time Δt may be set below the operation warranty time of the latch circuit 1. Even in this case, the warranty test of the setup time Ts and hold time Th can be performed.

The semiconductor integrated circuit device 200 of the second embodiment has the following advantages:

(1) The warranty test of the setup time Ts or hold time Th is executed by supplying either the first or second input terminal 3 or 4 with a test signal from a single signal source of a test device. Accordingly, the relative skew of the test signal supplied to the data input terminal D1 and the timing input terminal T1 of the latch circuit 1 is zero. Further, the timing skew of the signal source of the test device does not affect the time differences Δt and Δta between the test signals supplied to the data input terminal D1 and the timing input terminal T1. Therefore, the effect of the timing skew and the relative skew is eliminated and the warranty test of the setup time Ts and hold time Th is correctly executed. As a result, the deterioration of the yield of products due to excessive warranty based on erroneous test results is prevented. Furthermore, an expensive test device is not needed and an increase of the warranty test cost is prevented.

(2) The warranty test of the setup time Ts is executed by setting the delay time Δt of the delay circuit 2 to the setup time Ts and supplying the first input terminal 3 with a test signal TEST. Further, the warranty test of the hold time Th is executed by setting the delay time Δt of the delay circuit 2 to the hold time Th and supplying the second input terminal 4 with the test signal TEST.

(3) The warranty test of the setup time Ts is executed by setting the delay time Δta of the delay circuit 2 to be longer than the setup time Ts and supplying the second input terminal 4 with a test signal TEST. Further, the warranty test of the hold time Th is executed by setting the delay time Δta of the delay circuit 2 to be longer than the hold time Th and supplying the first input terminal 3 with the test signal TEST.

(4) When a test signal TEST is supplied to the first input terminal 3, the second input terminal 4 which is an unused terminal is disconnected from the delay circuit 2 by the switch SW2. Further, when a test signal TEST is supplied to the second input terminal 4, the first input terminal 3, which is an unused terminal, is disconnected from the delay circuit 2 by the switch SW1. Accordingly, in the delay circuit 2, the delay times Δt and Δta of the delay circuit 2 are correctly set without being affected by an electrostatic protection element and a bonding pad connected to the unused terminal. Consequently, the warranty test of the setup time Ts and hold time Th is correctly executed.

(5) In the normal operation mode, the delay circuit 2 is disconnected from the latch circuit 1 by turning on the switches SW1 and SW2 and turning off the switches SW3 and SW4. Accordingly, the latch circuit 1 operates without being affected by the delay circuit 2.

(6) Because the delay times Δt and Δta of the delay circuit 2 may be set exceeding the operation warranty times Ts and Th of the latch circuit 1, accuracy for the delay times Δt and Δta is not required.

Figure 8:
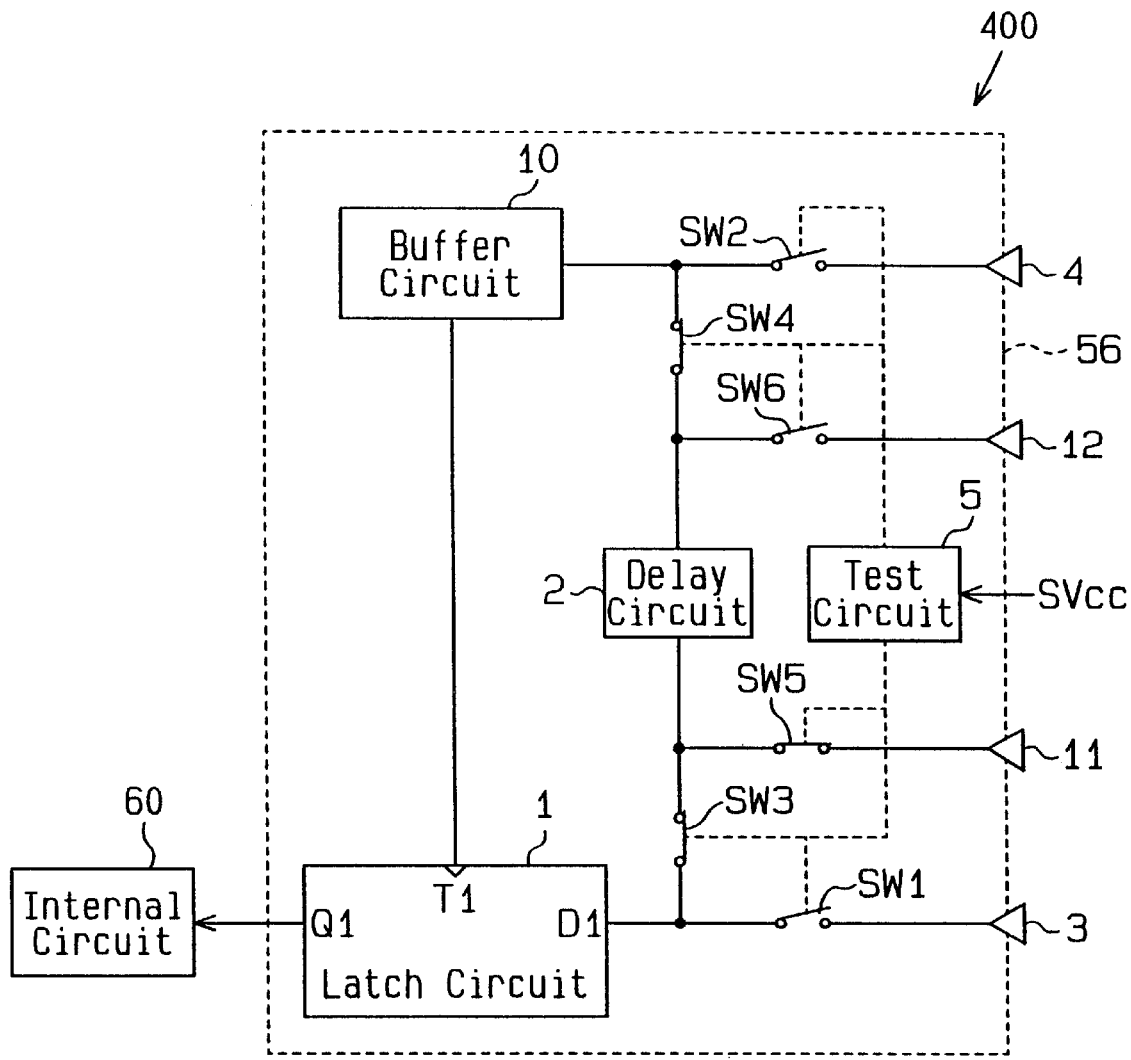
FIG. 8 is a schematic block diagram of a semiconductor integrated circuit device according to a third embodiment of the present invention.

FIG. 8 is a schematic block diagram of a semiconductor integrated circuit device 400 according to a third embodiment of the present invention. An input circuit 56 includes latch circuits 1 and first input terminals 3 (only one circuit and terminal are shown respectively) which correspond to the number of bits of a data bus signal, a delay circuit 2, a second input terminal 4, a buffer circuit 10 and test signal input terminals 11 and 12. The buffer circuit 10 receives an input signal supplied to the second input terminal 4 and supplies the timing input terminal T1 of each latch circuit 1 with the input signal.

The test signal input terminal 11 is connected to the node between the delay circuit 2 and a switch SW3 via a switch SW5 and the test signal input terminal 12 is connected to the node between the delay circuit 2 and a switch SW4 via a switch SW6. A test signal TEST is supplied from a test device to the test signal input terminals 11 and 12 to execute the setup time Ts or hold time Th warranty test. The test circuit 5 controls each of the switches SW1 to SW6.

When a test signal TEST is supplied to the test signal input terminal 11 and the setup time Ts or hold time Th warranty test is executed, the switches SW1, SW2 and SW6 are turned off and the switches SW3, SW4 and SW5 are turned on. Further, when the test signal TEST is supplied to the test signal input terminal 12 and the setup time Ts or hold time Th warranty test is executed, the switches SW1, SW2 and SW5 are turned off and the switches SW3, SW4 and SW6 are turned on.

In the normal operation mode after the warranty test has been terminated, the switches SW1 and SW2 are turned on and the switches SW3 and SW4 are turned off.

In order to reduce the load connected to the test signal input terminals 11 and 12 and reduce the effect of the delay circuit 2 on delay times Δt and Δta, the switches SW5 and SW6 may also be omitted.

Figure 9A:
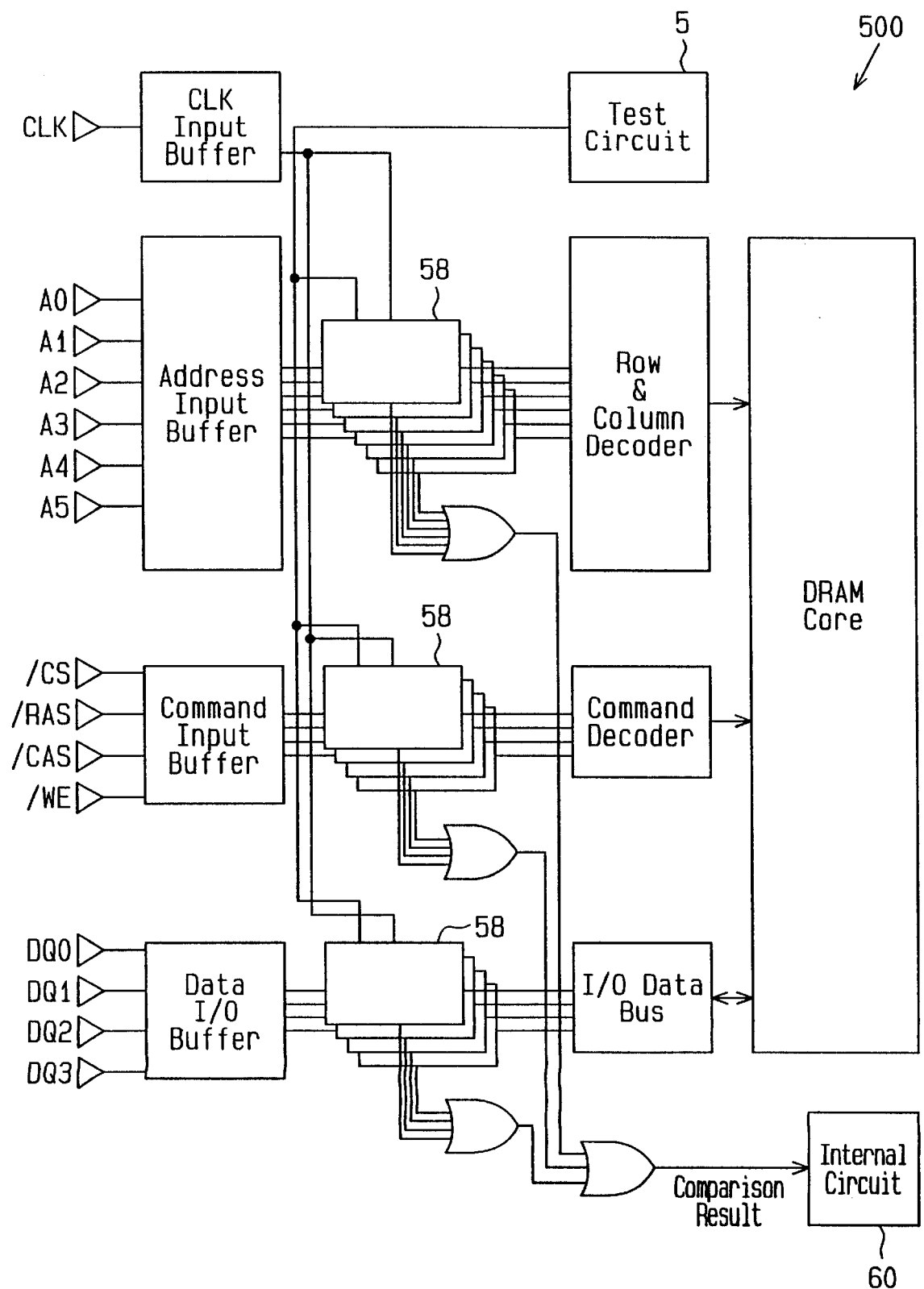
FIG. 9(a) is a schematic block diagram of a semiconductor integrated circuit device according to a fourth embodiment of the present invention.
Figure 9B:
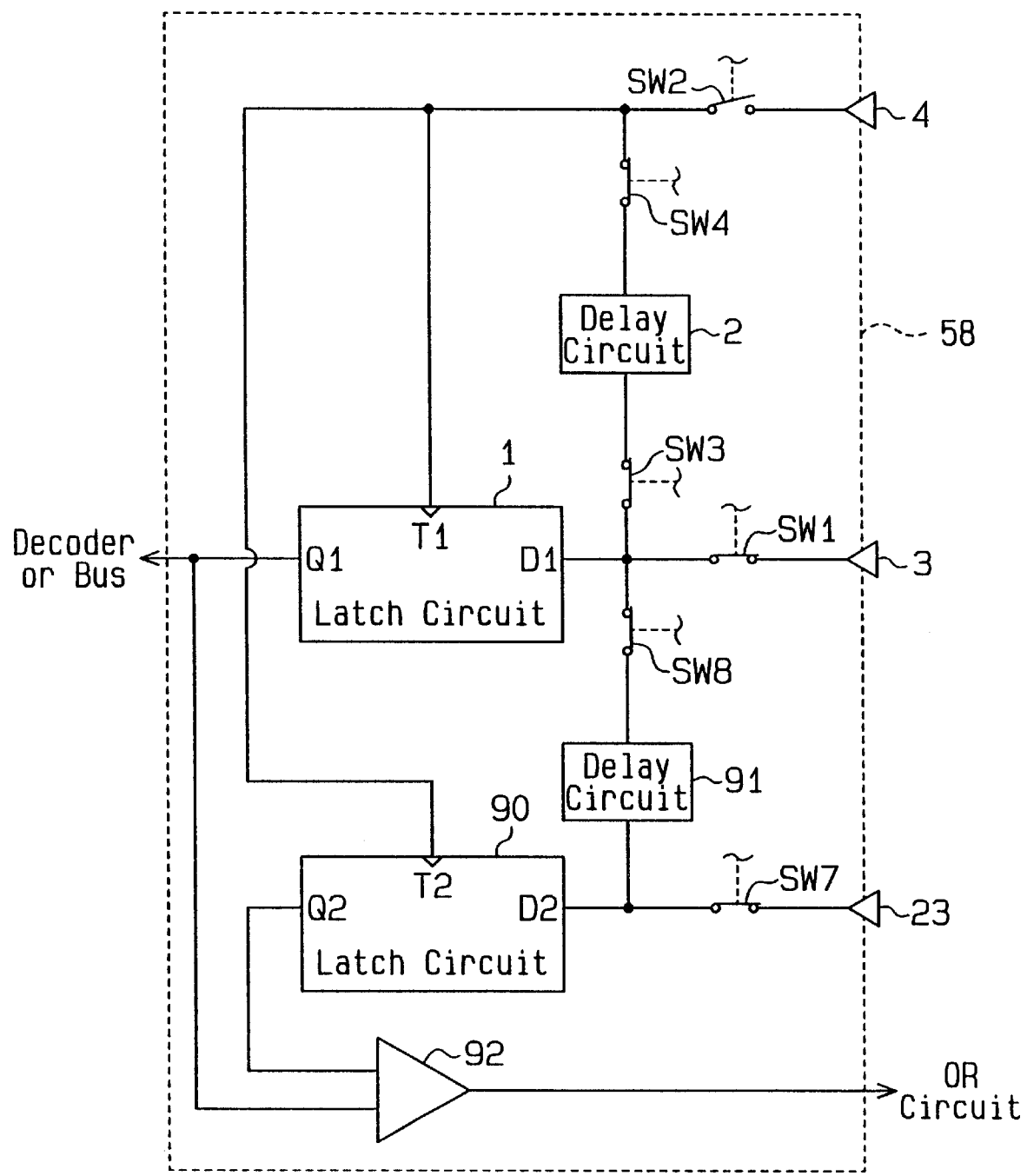
FIG. 9(b) is a schematic block diagram of an input circuit of the semiconductor integrated circuit of FIG. 9(a)

FIG. 9(a) is a schematic block diagram of a semiconductor integrated circuit device 500 of a fourth embodiment. The semiconductor integrated circuit 500 includes input circuits 58 having a reset function. Output signals of the input circuits 58 are compressed by OR circuits. The compressed signal of the OR circuits is provided to the internal circuit 60 as a comparison result signal, which is provided from the internal circuit 60 to the external circuit to evaluate it. As shown in FIG. 9(b), each of the input circuits 58 includes a latch circuit 1, a delay circuit 2, a reference latch circuit 90, a reference delay circuit 91 and a comparator 92. The reference latch circuit 90 has the same electrical characteristics as the latch circuit 1.

The data input terminal D2 of the reference latch circuit 90 is connected to a third input terminal 23 via a switch SW7. The timing input terminal T2 of the reference latch circuit 90 is connected to the timing input terminal T1 of the latch circuit 1. The first terminal of the reference delay circuit 91 is connected to the data input terminal D1 of the latch circuit 1 via a switch SW8 and the second terminal is connected to the data input terminal D2 of the reference latch circuit 90. The output terminal Q1 of the latch circuit 1 and the output-terminal Q2 of the reference latch circuit 90 are connected to the first and second input terminals of the comparator 92, respectively. The comparator 92 compares a latch signal of the latch circuit 1 and that of the reference latch circuit 90 and produces a reference output signal.

Next, the operation of a semiconductor integrated circuit device 500 is described with reference to FIGS. 10 (1)–10 (b). The setup time warranty test is executed by supplying the third input terminal 23 with a test signal and the hold time warranty test is executed by supplying the second input terminal 4 with the test signal TEST.

First, the setup time warranty test is described. First, switches SW1 and SW2 are turned off and switches SW3 and SW4 and the switches SW7 and SW8 are turned on.

Figure 10A:
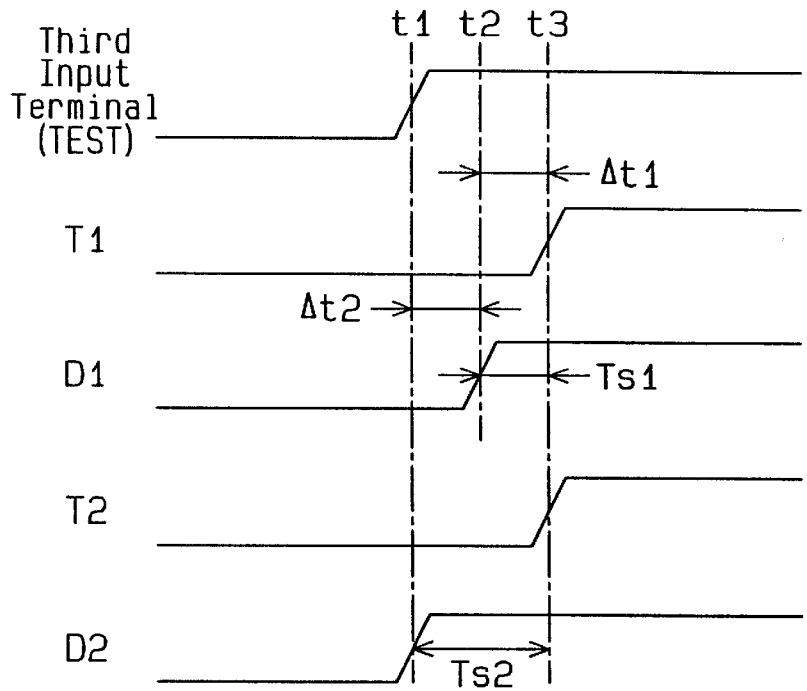
FIG. 10(a) is a waveform chart of a warranty test signal of the setup time supplied to the semiconductor integrated circuit device of FIG. 9(a)

As shown in FIG. 10(a), the test device causes the test signal TEST supplied to the third input terminal (i.e., the data input terminal D2 of the reference latch circuit 90) to rise to the H level at time t1. Then, a first delayed test signal, which rises to the H level at time t2 after the delay time $\Delta t2$ of the reference delay circuit 91, is supplied to the data input terminal D1 of the latch circuit 1. A second delayed test signal which rises to the H level at time t3 after the delay time $\Delta t1$ of the delay circuit 2 has elapsed from time t2 is supplied to the timing input terminal T1 of the latch circuit 1 and the timing input terminal T2 of the reference latch circuit 90. At this time, at time Ts1 before the time t3, a first delayed test signal having the H level is supplied to the data input terminal D1 of the latch circuit 1. Further, at time Ts2 ($\Delta t1 + \Delta t2$) before the time t3, a test signal having the H level is supplied to the data input terminal D2 of the reference latch circuit 90. Accordingly, when the second delayed test signal rises at the time t3, the reference latch circuit 90 latches the test signal having the H level more correctly than the latch circuit 1. If the comparator 92 comparison result between the latch output signal of the reference latch circuit 90 and the latch output signal of the latch circuit 1 matches, the setup time Ts1 of the latch circuit 1 is guaranteed. In other words, if the comparison result of the comparator 92 mismatches, the setup time Ts1 is not guaranteed.

Next, the hold time warranty test is described. First, the switches SW1 and SW7 are turned off and switches SW2, SW3, SW4 and SW8 are turned on.

Figure 10B:
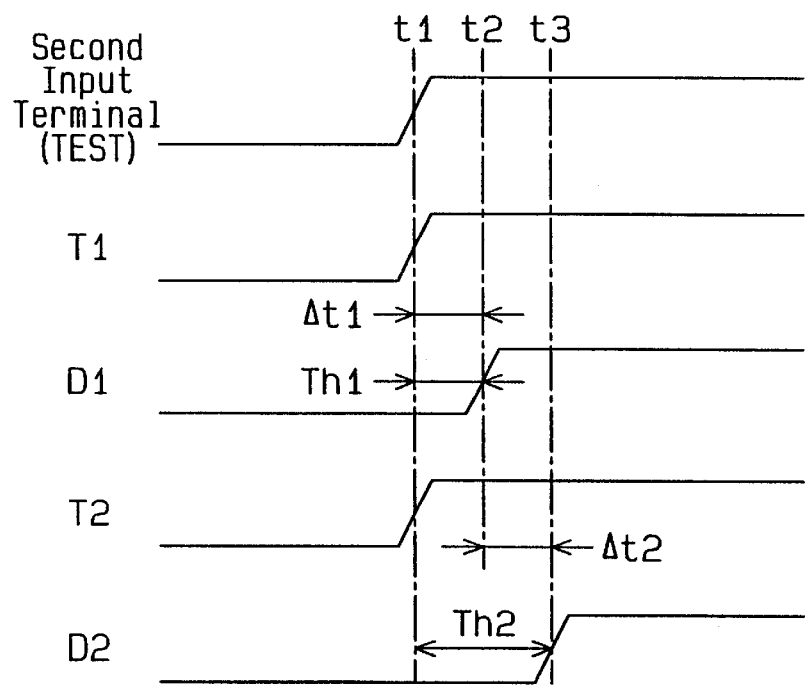
FIG. 10(b) is a waveform chart of a warranty test signal of the hold time supplied to the semiconductor integrated circuit device of FIG. 9(a)

As shown in FIG. 10(b), the test device makes the test signal TEST supplied to the second input terminal 4 (i.e., the timing input terminal T1 of the latch circuit 1 and the timing input terminal T2 of the reference latch circuit 90) rise to the H level at time t1. Then, a first delayed test signal which rises to the H level at time t2 after the delay time $\Delta t1$ of the delay circuit 2 is supplied to the data input terminal D1 of the latch circuit 1. A second delayed test signal which rises to the H level at time t3 after the delay time $\Delta t2$ of the reference delay circuit 91 has elapsed from time t2 is supplied to the data input terminal D2 of the reference latch circuit 90. That is, after the time Th1 ($\Delta t1$) has elapsed from time t1, a first delayed test signal having the H level is supplied to the data input terminal D1. Further, after time Th2 ($\Delta t1 + \Delta t2$) has elapsed from the time t1, a second delayed test signal having the H level is supplied to the data input terminal D2. Accordingly, when a test signal rises at the time t1, the reference latch circuit 90 can latch the second delayed test signal having the L level more correctly than the latch circuit 1. If the comparison result between the latch output signal of the reference latch circuit 90 and the latch output signal of the latch circuit 1 matches, the hold time Th1 of the latch circuit 1 is guaranteed. In other words, if the comparison result of the comparator 92 mismatches, the hold time Th1 is not guaranteed.

In the normal operation mode after the warranty test has been completed, the switches SW1 and SW2 are turned on and the switches SW3, SW4, SW7 and SW8 are turned off.

The delay time $\Delta t2$ of the reference delay circuit 91 and the delay time $\Delta t1$ of the delay circuit 2 may not be the same. Preferably, the delay time $\Delta t2$ of the reference delay circuit 91 is set so that the reference latch circuit 90 can correctly latch the data signal.

The semiconductor integrated circuit device 500 of the fourth embodiment has the following advantages:

(1) The warranty test of the setup time Ts1 or hold time Th1 is correctly executed by comparing the latch output signal of the reference latch circuit 90 which correctly latches the data signal and the latch output signal of the latch circuit 1 using the comparator 92.

(2) Judgment of the result of the warranty test using the comparator 92 facilitates testing using a test device and reduces the test cost.

It should be apparent to those skilled in the art that the present invention may be embodied in many other specific forms without departing from the spirit or scope of the invention. Particularly, it should be understood that the invention may be embodied in the following forms.

Figure 11:
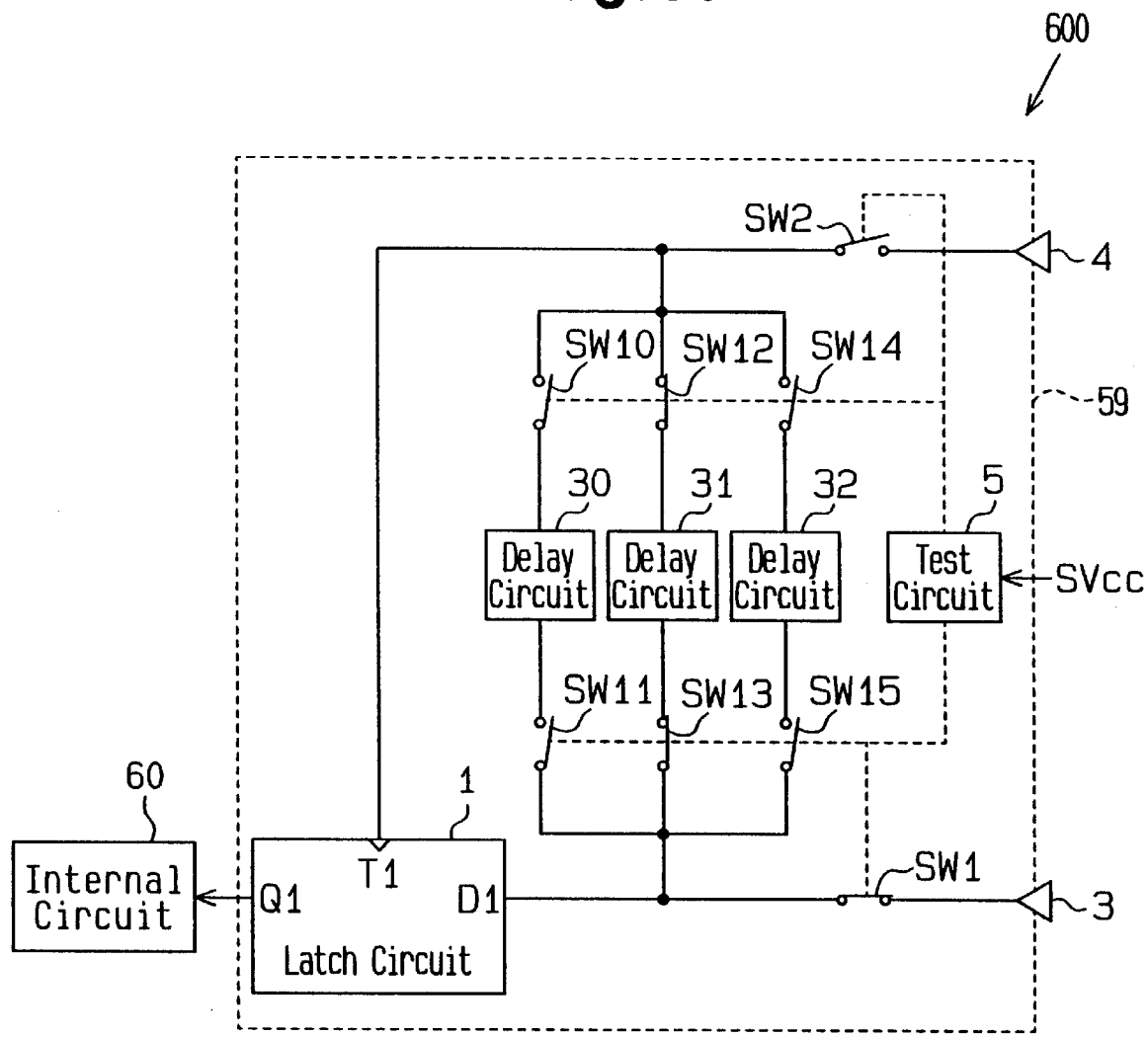
FIG. 11 is a schematic block diagram of a semiconductor integrated circuit device according to a fifth embodiment of the present invention.

(a) The delay time of the delay circuit 2 may be variable. Preferably, the delay circuit 2 has a variable capacitance element. Otherwise, the delay circuit 2 has a plurality of buffer circuits that can switch the number of steps of the buffer circuits. Further, for example, as shown in FIG. 11, a semiconductor device 600 having input circuits 59 (only one is shown) which include a plurality of delay circuits 30, 31 and 32 having different delay times. In this case, any one of the delay circuits 30, 31 and 32 is selected by switches SW10 to SW15. The switches SW10 to SW15 are controlled by the test circuit 5. Thus, the time difference between the test signal supplied to the data input terminal D1 of the latch circuit 1 and the test signal supplied to the timing input terminal T1 becomes variable. Accordingly, the setup time or hold time warranty test under various conditions may be conducted.

Figure 12:
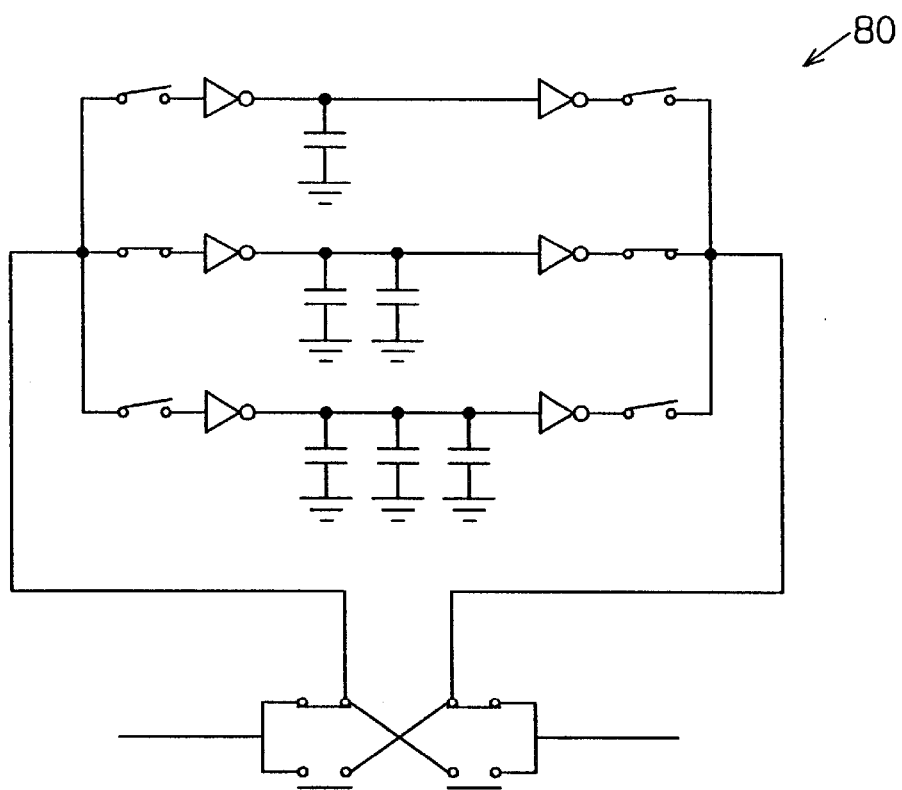
FIGS. 12 to 14 are circuit diagrams of a variable delay time type delay circuit in accordance with the present invention.
Figure 13:
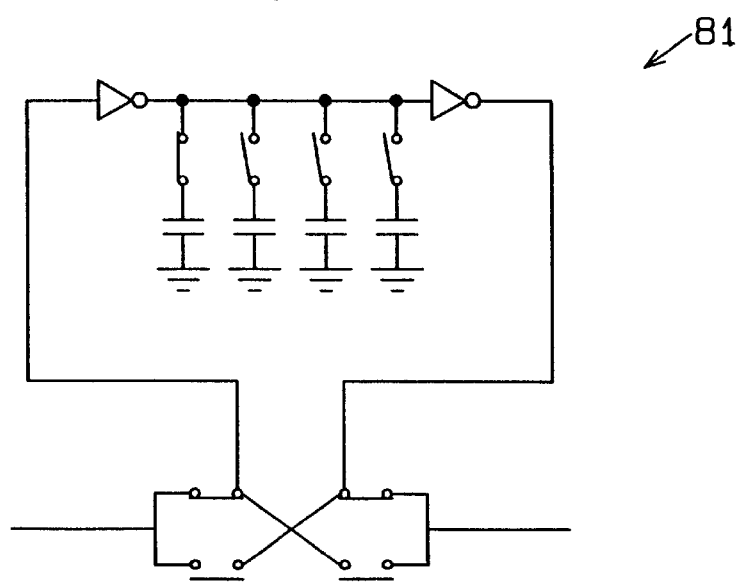
Figure 14:
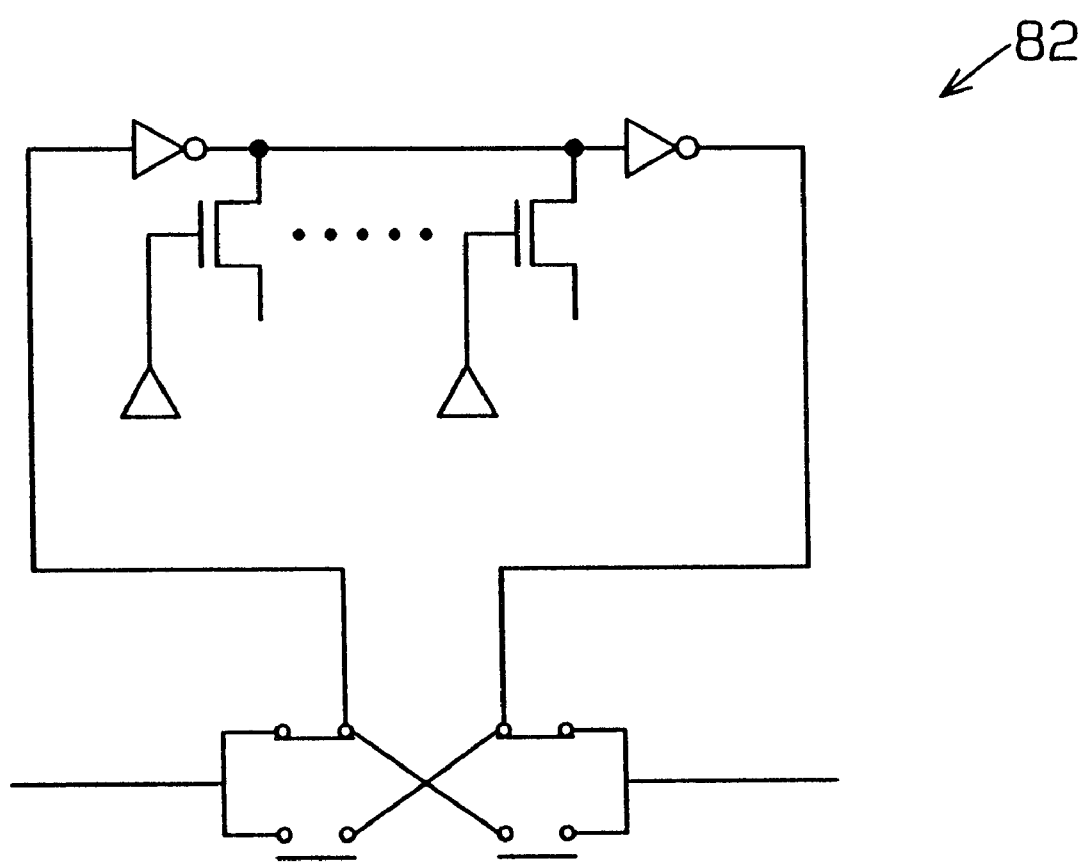

Alternatively, as shown in FIGS. 12 to 14, variable delay time type delay circuits 80–82 may be used.

(b) The switches SW1 to SW8 may also be controlled as described below. For example, a pad is connected to each of the switches SW1 to SW8, and the switches SW1 to SW8 are turned on and off by applying a predetermined voltage to each pad in the initial test in the wafer level. In this case, if no voltage is applied to each pad, the switches SW1 and SW2 are turned on and the switches SW3 to SW8 are turned off. By such control, the test circuit 5 is omitted and increase of the chip area is prevented.

(c) The present invention applies to the warranty test of the setup time and hold time of the latch circuit 1 which latches the data signal according to the leading edge of the test signal supplied to the timing input terminal T1. Instead, the present invention may also apply to a latch circuit which latches the data signal according to the leading edge of the test signal. The data signal to be latched may be the H level or the L level. Further, the present invention enables the warranty test to be performed under all conditions and can be applied to various semiconductor integrated circuit devices.

(d) The warranty test of either the setup time Ts or hold time Th may be executed. For example, if the warranty test is executed by supplying the second input terminal 4 with a test signal TEST, the switch SW2 can be omitted.

In the third embodiment, the warranty test of the setup time Ts or hold time Th may also be executed by omitting either the test signal input terminal 11 or 12.

Further, in the fourth embodiment, the warranty test of the hold time Th may also be executed by omitting the third input terminal 23 and the switch SW7.

(e) A test signal TEST is generated using the test circuit 5. The test signal may also be supplied from the test circuit 5 to the timing input terminal T1 or the data input terminal D1 of the latch circuit 1 and the delay circuit 2. In this case, because the load of a test device is reduced and testing using the test device is simplified, the test cost is reduced. Because the test circuit 5 is formed in a semiconductor integrated circuit device, the test signal TEST is generated using the test circuit 5 in accordance with the operation speed of the semiconductor integrated circuit device. Therefore, the high speed of the semiconductor integrated circuit device can easily be supported. Further, unlike the test circuit 5, a signal generation circuit may also be provided in the semiconductor integrated circuit device.

Therefore, the present examples and embodiments are to be considered as illustrative and not restrictive and the invention is not to be limited to the details given herein, but may be modified within the scope and equivalence of the appended claims.

What is claimed is:

1. A semiconductor integrated circuit device comprising:
   a latch circuit having a data input terminal and a timing input terminal;
   a first input terminal coupled to the data input terminal of the latch circuit;
   a second input terminal coupled to the timing input terminal of the latch circuit;
   a delay circuit, coupled between the first input terminal and the second input terminal; and
   a switching portion for transmitting an input signal, which is supplied to one of the first and second input terminals, to one of the data input terminal and the timing input terminal and transmitting the input signal via the delay circuit to the other one of the data input terminal and the timing input terminal.

2. The device of claim 1, wherein the switching portion includes:
   a first switch coupled between the first input terminal and the delay circuit; and
   a second switch coupled between the second input terminal and the delay circuit, wherein the first and second switches are turned off in a normal operation mode of the semiconductor integrated circuit device and are selectively turned on and off in a test mode.

3. The device of claim 2, further comprising:
   a test circuit, coupled to the first and second switches, for controlling the first and second switches.

4. The device of claim 1, wherein the switching portion includes a switch coupled between at least one of the first and second input terminals and the latch circuit, wherein the switch is turned off in a test mode.

5. The device of claim 4, further comprising:
   a test circuit, coupled to the switch, for controlling the switch.

6. The device of claim 1, further comprising:
   a signal generation circuit, coupled to at least one of the first and second input terminals, for generating an input signal and supplying the input signal to the coupled one of the at least the one of the first and second input terminals.

7. The device of claim 1, further comprising:
   a buffer circuit coupled between the second input terminal and the timing input terminal of the latch circuit.

8. The device of claim 1, wherein a delay circuit is configured so that the delay time varies.

9. A semiconductor integrated circuit device comprising:
   a latch circuit having a data input terminal and a timing input terminal;
   a first input terminal coupled to the data input terminal of the latch circuit;
   a second input terminal coupled to the timing input terminal of the latch circuit;
   a delay circuit coupled between the first input terminal and the second input terminal;
   a test signal input terminal coupled to at least one of a first node between the first input terminal and the delay circuit and a second node between the second input terminal and the delay circuit; and
   a switching portion for transmitting a test signal, which is supplied to the test signal input terminal, to one of the data input terminal, and the timing input terminal and transmitting the test signal via the delay circuit to the other one of the data input terminal and the timing input terminal.

10. A semiconductor integrated circuit device comprising:
   a latch circuit having a first data input terminal, a first timing input terminal and a first output terminal;
   a first input terminal coupled to the first timing input terminal of the latch circuit;
   a delay circuit, coupled between the first input terminal and the first data input terminal;
   a reference latch circuit having a second data input terminal, a second timing input terminal and a second output terminal, wherein the second timing input terminal of the reference latch circuit is coupled to the first timing input terminal of the latch circuit and the first data input terminal;
   a second input terminal coupled to the second data input terminal;
   a reference delay circuit coupled between the first data input terminal of the latch circuit and the second data input terminal of the reference latch circuit;
   a comparator coupled to the first output terminal of the latch circuit and the second output terminal of the reference latch circuit; and
   a switching portion for transmitting an input signal, which is supplied to one of the first and second input terminals, to one of the second data input terminal and a group of the first and second timing input terminals, transmitting the input signal via the delay circuit to the first data input terminal, and transmitting the input signal via the delay circuit and the reference delay circuit to one of the second data input terminal and the group of the first and second timing input terminals.

11. A method of testing one of a setup time and a hold time of a latch circuit of a semiconductor integrated circuit, the latch circuit having a data input terminal and a timing input terminal, a delay circuit being coupled between the data input terminal and the timing input terminal, the method comprising the steps of:
   supplying a test signal to one of the data input terminal and the timing input terminal of the latch circuit using a switching portion;
   delaying the test signal with the delay circuit;
   providing the test signal delayed by the delay circuit to the other one of the data input terminal and the timing input terminal of the latch circuit using the switching portion.

12. The method of claim 11, wherein the step of supplying the test signal includes supplying the test signal to the data input terminal in a warranty test of the setup time of the latch circuit, and supplying the test signal to the timing input terminal in a warranty test of the hold time of the latch circuit.

13. The method of claim 12, wherein the warranty test is performed based on a relationship between the edge of the test signal and the edge of the delayed test signal.

14. The method of claim 11, wherein the test signal has a pulse width which corresponds to a total of a delay time of the delay circuit and an operation warranty time of the latch circuit, and wherein the step of supplying the test signal includes supplying the test signal to the timing input terminal in a warranty test of the setup time of the latch circuit, and supplying the test signal to the data input terminal in a warranty test of the hold time of the latch circuit.

15. The method of claim 14, wherein the warranty test of the latch circuit is performed based on a relationship between the edge of the test signal and the edge of the delayed test signal.

* * * * *